United States Patent

[11] 3,549,809

[72] Inventor Wolfgang G. Stehr
Tempe, Ariz.

[21] Appl. No. 724,813
[22] Filed Apr. 29, 1968
[45] Patented Dec. 22, 1970
[73] Assignee Motorola, Inc.
Franklin Park, Ill.
a corporation of Illinois

[54] UNATTENDED DATA TRANSMISSION
12 Claims, 1 Drawing Fig.

[52] U.S. Cl. .......... 179/2
[51] Int. Cl. .......... H04m 11/06
[50] Field of Search .......... 179/2DP, 2R, 5, 6R; 343/225, 226

[56] References Cited
UNITED STATES PATENTS
3,466,395 9/1969 Prins .......... 179/2

*Primary Examiner*—Kathleen H. Claffy
*Assistant Examiner*—Tom D'Amico
*Attorney*—Mueller, Aichele & Rauner

ABSTRACT: A data source is selectively connected through a data phone to a telephone communication network. Interface means selectively responsive to signals generated by the data phone initiate operation of the data source, such as starting the motor in a document reader and initiating data transmission after checking communication channel security. If after a predetermined time certain signals have not been continuously received, the data source is disconnected from the communication network; power is not turned off. A power-out circuit turns the power off in the data source upon the completion of transmission of data signals over the communication network.

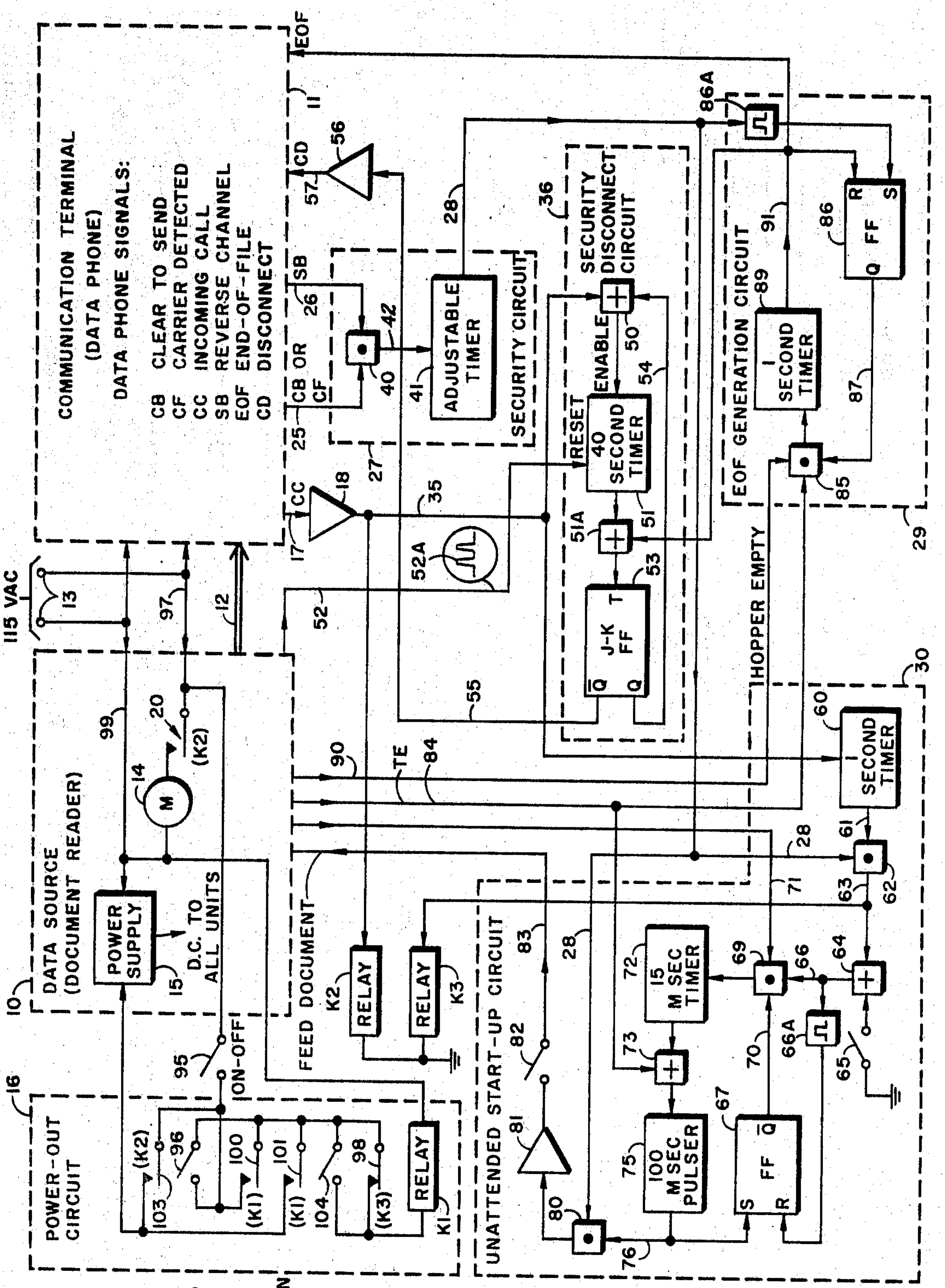
LEGEND:
- AND GATE
- OR GATE
- FF FLIP-FLOP
- T TOGGLE INPUT CONNECTION
- TE TRAILING EDGE
- PULSE FORMER
INVENTOR
WOLFGANG G. STEHR
BY
Mueller, Aichele & Rauner
ATTORNEYS

UNATTENDED DATA TRANSMISSION

BACKGROUND OF THE INVENTION

This invention relates to data-signal transmitters, especially to those transmitters adapted to automatically operate in an unattended manner.

With the advent of many improvements in automated data processing, the importance of data transmissions between remote sites has increased. In many large organizations having widely dispersed operations at various locations, it is desired because of decreased usage of the communication network at night, to provide for unattended automatic transmission of data from remote locations to a central location. Such unattended transmissions should have certain security features such that a wrong number dialed into the remote location does not inadvertently cause transmission of data signals to an improper receiver. Further, because of the possibilities of a large number of relatively small remote stations, it is also desired that the transmitting station be made as simple as possible for permitting low-cost construction. Also, in a large sales organization it may be desirable for the salesman to carry a transmitting station with him, for example, in a suitcase, and when in his motel room send his sales reports over the data line to a central sales station. It is also desired that any unattended station have manual overrides such that any night operator seeing a malfunction could correct the same to ensure valid data transmissions.

SUMMARY OF THE INVENTION

It is an object of this invention to provide a relatively simple unattended data station which is automatically connected to and disconnected from a communication network terminal; the station ignores wrong number calls.

A feature of the present invention is a provision of a timing delay responsive to signals from a communication network terminal for disconnecting the communication network from a data source, such as a document reader, in the event a predetermined signal is not supplied during a predetermined elapsed time. A power-off apparatus is responsive to such a disconnection from a communication network not to remove power from the data source; however, upon the termination of data transmission the power-off apparatus disconnects power from the unattended station.

Another feature is the utilization of a security-detection circuit responsive to at least two signals from a communication terminal indicating that a proper communication circuit has been established for initial operation of the unattended station. Initiation of the operation of the station does not immediately require data signal transmission; rather, a predetermined time delay enables security circuits to function and detect a proper communication connection prior to the transmission of data signals. A start-up circuit responsive to the data source ensures that data is available to be transmitted through the communication network prior to the initiation of connections enabling data-signal transmissions. Analog timing circuits are utilized throughout the control to simplify the construction for making the control circuitry of low-cost construction. The invention is also usable with a data receiver or stations having both a data source and a data receiver.

THE DRAWING

The FIG. is a block-schematic diagram of a transmitting station adapted to be automatically selectively connected to a telephone communication network.

DETAILED DESCRIPTION OF THE ILLUSTRATED EMBODIMENT

A data source 10, such as a document reader of known design, in the illustrated station is selectively connected by communication terminal 11, consisting of a "data phone", to the telephone communication network. Terminal 11 is of known design and will not be further described. Data signals are selectively supplied over cable 12 to communication terminal 11 under control of the circuits shown in the FIG. Both terminal 11 and data source 10, as well as the other illustrated circuits, receive power from 115 volts AC terminals 13. The data source 10 document-drive motor 14 is turned on when communication terminal 11 supplies a signal indicating detection of an incoming call. Power supply 15 had previously been turned on awaiting the unattended data transmission. Power supply 15 supplies DC power to the entire station including data source 10, security circuit 27, EOF generation circuit 29, disconnect circuit 36, start-up circuit 30, power-off circuit 16, and amplifiers 18 and 56. On completion of the data transmission, power-off circuit 16 turns power supply 15 off thereby closing down the illustrated transmitting station. Power supply 15 is under control of power-off circuit 16, including relay K1 as well as relays K2 and K3. Upon the receipt of an incoming call, communication terminal 11 supplies a continuous signal over line 17 through amplifier 18 to actuate relay K2. Relay K2 closes normally-open contacts 20 for starting motor 14. At this time, no documents are being moved, the motor being started in preparation for document reading and transmission of signals over cable 12. Simultaneously therewith, communication terminal 11 supplies a communication indicating signal CB or CF over line 25 to security circuit 27. Line 25 carries a continuous signal indicative that the data phone has been conditioned for data transmission, i.e., signal CB indicating "clear to send" or signal CF indicating that a carrier signal in a communication network has been detected. After the receiving data phone (not shown) is connected to communication terminal 11 and is in the data mode, it supplies a reverse channel indication to communication terminal 11 indicating it is ready to receive data signals. Then communication terminal 11 supplies continuous signal SB over line 26. It is remembered that in the usual data phone there are two modes of operation, the voice mode for voice communication and the data mode for digital coded communication. Security circuit 27 supplies "-data-source proceed" signal over line 28 for conditioning the unattended start-up circuit 30 and end-of-file signal generation circuit 29, later described. Circuit 30 then initiates sequences for starting data-signal transmissions. Simultaneously with the above-referred to start-up procedure, the signal on line 35, indicating that an incoming call has been received, enables operation of timer 51 in security disconnect circuit 36 which times out a 40-second period. If a data transmission occurs before expiration of a 40 -second period, the timer 51 is reset for initiating a new 40-second time-out period; if no data transmission occurs in any 40-second period after the signal on line 35 becomes positive or after a completed data transmission, the data station is disconnected from the communication network by terminal 11. The signals on lines 17 and 35 must be continuous for a predetermined time before initiation of, and during transfer of data signals from data source 10 to communication terminal 11, as will become fully apparent.

Before proceeding with the system description, operation of some of the system components is described. Flip-flop 53 is a J-K flip-flop, while flip-flop 67 and 86 are set-reset type, or commonly known as the bistable Eccles-Jordan type. Operation of the latter flip-flops are so well known they will not be discussed. It is also known that flip-flops are responsive to input signals as set forth in the below table wherein 1 indicates positive signal or flip-flop is set and 0 a negative signal or flip-flop is reset; *x* indicates the flip-flop is nonresponsive to the input.

J-K FLIP-FLOP

| Old state | J-input | K-input | New state |
|---|---|---|---|
| 0 | 0 | x | 0 |
| 0 | 1 | x | 1 |
| 1 | x | 0 | 1 |
| 1 | x | 1 | 0 |

The J-K flip-flop described by Seelbach et al. in U.S. Pat. No. 3,351,778 is usable with this invention. The clock signal can be provided in any known manner; for that reason it is not shown or described.

The various timers (41, 51, 72, and 89) are of similar construction. Each timer uses a capacitor as a timing element which has its charge altered through a resistor to provide a time constant. The input signal (enable) is continuous for altering the charge on the capacitor. A unijunction transistor or field effect transistor (FET) signal generation circuit, of known design, is responsive to a predetermined voltage on the capacitor to supply a positive signal indicating expiration of a predetermined time delay. This signal may be either a pulse of short duration (unijunction circuit) or a continuous signal (FET circuit) maintained as long as the continuous input signal remains. Of course, any timer configuration may be utilized including digital timers. The continuous input signal may also open a gate for passing clock pulses which alter the capacitor charge. In this manner, the analog time-out period is synchronized with clock pulses which actuate flip-flops.

Referring now more particularly to security circuit 27, lines 25 and 26 are connected through AND circuit 40 to initiate operation of adjustable timer 41. As explained above, timer 41 may be a FET type RC timer which, upon the expiration of a predetermined time, emits a relatively positive continuous signal. For example, the continuous signals from lines 25 and 26 provide a continuous signal on line 42 which charges a capacitor (not shown) to initiate conduction of a FET transistor (not shown) in a signal generation circuit. The adjustable timer is typically adjustable from 1 to 10 seconds (as by varying the time constant of the capacitor charging) depending upon the desired noise rejection for telephone communication network. For example, the more noise on the line, the longer the timer 41 is set to check the communication indicating signals on lines 25 and 26. If the communication network is completely secure, adjustable timer 41 may be dispensed with. Upon the expiration of the predetermined time period determined by timer 41, a positive data-proceed signal is supplied over line 28 as a continuous signal for as long as both lines 25 and 26 continue to carry their respective signals. The theory is that an erroneous (wrong number) call would not energize the timer 41 since SB will not be present continuously, but only as spurious noise under most adverse conditions.

With respect to the security signals on lines 25 and 26, as well as other signals entering and leaving communication terminal 11, there are many models of the data phone for use in communication telephone networks. Each model of the data phone may have its own logic arrangement requiring different control input signals as well as emitting or being capable of emitting different security or network condition-indicating signals. Therefore, on lines 17, 25, and 26 there is shown a choice of a plurality of signals, it being understood that any signals indicating the functions listed inside the box indicating communication terminal 11 may be used. It is also pointed out that the definitions used in this application are particularly applicable to the illustrated interface and the terms may not be so defined in other situations.

Referring again to security disconnect circuit 36, the 40-second disconnect is based on the theory that some data signals should be transferred before expiration of 40 seconds after receipt of an incoming call or after reading one document and initiating reading of a second document. Upon each data transmission over cable 12 by source 10, a reset pulse 52A supplied over line 52 resets 40-second time-out timer 51 to restart the above-described 40-second time-cut cycle. This resetting is accomplished, for example, by supplying the line 52 pulses to a gate electrode of an SCR (not shown) which discharges the capacitor in a unijunction time-out timer. If no reset pulses are supplied over line 52 before the expiration of the 40 -second time-out period, either after an incoming call or later during a data transmission cycle, a positive signal of short duration is supplied to toggle J-K flip-flop 53. The toggle connection of a J-K flip-flop is where the input signal is simultaneously applied to both the J and K input connections and whenever the input signal is a 1 (positive) the flip-flop changes state. Flip-flop 53 was initially in the reset state. Flip-flop 53 after being set supplies a relatively negative signal over line 55 through amplifier 56, thence line 57 to communication terminal 11. This line 57 signal when negative indicates that data source 10 is to be disconnected from the communication network. However, when flip-flop 53 is reset, a relative positive signal is supplied over line 57, indicating that data source 10 should not be disconnected from the communication terminal. The construction of data phone 11 which effects a disconnect from a communication terminal is well known and need not be discussed for that reason. Being set, flip-flop 53 also supplies an enabling signal, i.e., a relatively positive signal, over line 54 which reenables the 40-second time-out timer 51. The purpose of the connection of line 54 is to reset flip-flop 53 subsequent to the time that data phone or communication terminal 11 has disconnected data source 10 from the communication network, and enables the communication terminal 11 to accept future calls.

Having described the incoming call security system, the start-up procedure effected by unattended start-up circuit 30 is described in detail. The incoming-call indicating signal on line 35 enables 1-second time-out timer 60. Upon the expiration of 1-second, a continuous signal is supplied over line 61 to AND 62. AND gate 62 is then conditioned to pass the data-proceed signal on line 28 thereby supplying a continuous "read operation initiated" signal over line 63 to actuate relay K3. Relay K3 when actuated indicates that a data transmission from data source 10 has been initiated. Its function with respect to power-off circuit 16 will be later described. The positive signal on line 63 is also supplied through OR gate 64 to condition AND gate 69. OR gate 64 is also connected to manual switch 65 which is used to initiate data transfer in what is termed an attended mode, i.e., an operator initiates data transmission. The signal supplied by OR gate 64 over line 66 is identical in either mode; therefore start-up circuit 30 provides the later described interclock features for both modes of operation. The transmitting station is therefore capable of attended modes of operation through communication terminal 11. This latter mode is not pertinent to the present invention and will not be further described.

OR gate 64 supplies its signal to pulse former 66A which emits a short duration pulse to reset flip-flop 67. Upon being reset, flip-flop 67 supplies a relatively positive or enabling signal over line 70 for partially conditioning AND gate 69. The third input to AND gate 69 is supplied from line 71 from data source 10 indicating that no document is currently being processed. The signal ensures that start-up circuit 30 operates only before the first document reaches the read station. When documents are being processed, a disabling signal, i.e., relatively negative signal, is supplied over line 71 to permanently disable AND gate 69 during the entire cycle of data transmission. The signal supplied by AND gate 69 initiates 15-millisecond time-out timer 72. The output signal from timer 72 is supplied through OR gate 73 to initiate 100-millisecond pulser 75 which supplies one 100-millisecond pulse upon each actuation. This long signal is used to operate a solenoid in data source 10. From line 76 the 100-millisecond pulse passes through AND gate 80 conditioned by the data source proceed signal on line 28. AND gate 80 supplies the 100-millisecond pulse on a document-feed signal through amplifier 81, closed interrupt switch 82, thence over line 83 to data source 10. This signal initiates operation of data source 10 by actuating a solenoid (not shown) to feed a document to be read and then supply the read data signals over cable 12 to communication terminal 11. The responsiveness of data source 10 to the signal on line 83 is accomplished by apparatus of known design and will not be further discussed.

The pulser 75 signal on line 76 also resets flip-flop 67 to disable AND gate 69, even though a no-document in read station signal would be supplied over line 71. A reinitiation of a data transfer either by a new closure of switch 65 or a new signal on line 63 would reactivate pulse former 66A which is responsive to the leading edge of such new signals to emit a pulse of short duration.

After the receipt of the line 83 signal, data source 10 automatically supplies sets of data signals over cable 12 to communication terminal 11 for transmission to the receiving station (not shown). These sets of data signals may be recorded on a plurality of documents such as tabulating cards. It is well known that a document reader can automatically process a stack of such tabulating cards and the operation of such is well known and understood. These tabulating cards may have format marks thereon which generate the timing signals 52A supplied over line 52 for resetting 40-second time-out timer 51. Of course, with an M of N code or other forms of data recording, timing signals 52A, usually generated in correspondence with one column or one set of data being forwarded to communication terminal 11, can be supplied. The generation of such timing signals is well known.

Upon each document passing through the document reader 10, a trailing edge signal, TE is supplied over line 84 to OR gate 73 which reinitiates 100-millisecond pulser 75 and to AND gate 85 in end-of-file (EOF) signal generation circuit 29, later described. The 100-millisecond pulse on line 76 is again passed through AND gate 80 and over line 83 to initiate feeding the next document. Therefore, the trailing edge signal on line 84 is utilized not only for end-of-file signal generation but for initiating the transport of the next succeeding document in the hopper through the document reader (not shown) of data source 10. This cycle is repeated until the hopper has been emptied.

The termination of data transfer by EOF signal generation circuit 29 is described. AND circuit 85 is conditioned to pass the trailing edge signal, TE, whenever the hopper-empty signal is present on line 90 and flip-flop 86 is set. Pulse former 86A is responsive to the leading edge of the data proceed signal supplied by timer 41 to supply a pulse of short duration setting flip-flop 86. Therefore, flip-flop 86 is set during data transmissions. When set, flip-flop 86 supplies a relatively positive signal over line 87. The trailing edge TE signal is passed by AND gate 85 over line 88 initiating one-second time-out timer 89. For example, document reader 10 has a card-actuated switch in the bottom plate of a hopper which is closed to provide a relatively positive signal on line 90 after the last document has been transported through the reader. Such constructions in document hoppers are well known and will not be further described. However, when there are documents in the hopper of reader 10, a relatively negative signal on line 90 disables or prevents AND gate 85 from passing to TE signal. After the last document has been processed and all data signals have been transferred to communication terminal 11, 1-second time-out timer 89 supplies a positive-going pulse of short duration over line 91 resetting flip-flop 86 thereby disabling AND gate 85 and ensures one EOF per transmission and also supplies the pulse to communication terminal 11 which then generates a standard end-of-file signal. Such end-of-file (sometimes called end-of-message) signals are known and will not be further described. The line 91 pulse is also supplied through OR gate 51A to toggle flip-flop 53. It is remembered flip-flop 53 had been reset. After toggling it is set to supply a disconnect signal to communication terminal 11 over line 57. Operation is as previously described for timer 51 supplied pulse to set flip-flop 53. Without the line 91 connection to OR gate 51A, the 40-second time-out period can be permitted to expire and generating a disconnect signal on line 57 because of no further data transmissions by source 10.

After the receipt of the signal on line 57 communication terminal 11 disconnects data source 10 from the communication network as by "hanging up" the telephone. The signal supplied over line 17 is then removed which disables relay K2 and opens contacts 20 to stop motor 14.

Upon termination of the data transmission, power-off circuit 16 is operative to disconnect power from the station. The complete cycle operation of power-off circuit 16 will now be described for complete understanding of the power cycling during the entire data transmission cycle. To start the operation, on-off switches 95 and 96 are first closed, completing a circuit from power line 97 through switch 95, switch 96, thence normally closed contacts 98 of control relay K3, thence relay K1 to opposite line 99 of the 115 VAC power source. Relay K1 then closes contacts 100 and 101 and latches itself. At this time switch 96 is opened and power cycle then is set up for unattended operation. Upon the receipt of the signal on line 17 from data phone 11, relay K2 is actuated. This action closes normally open contacts 20 for actuating motor 14 in preparation for transportation of documents through document reader 10. Assuming that time-out timer 51 supplies a signal over line 52 resetting flip-flop 53 (no data transmission occurred), communication terminal 11 disconnects the communication network from data source 10 thereby removing any signal on line 17. This, in turn, deactuates relay K2, opening normally open contacts 20, stopping motor 14. No effect is had on power supply 15, the station remaining in a ready condition for unattended data transmission. This latter function occurs usually upon the receipt of an incoming call that does not initiate a data transfer; as a wrong number or poor communication connection.

If a data transmission cycle has been initiated by start-up circuit 30, relay K3 has been actuated by the signal on line 63. Actuation of relay K3 opens normally-closed contacts 98, thereby deactivating relay K1 and opening contacts 100 and 101. The previous actuation of relay K2 had closed normally-open contacts 103 which are in parallel circuit to the contacts 100 and 101 and maintaining power on so long as K2 is actuated. During transmission of data signals, contacts 103 being closed, maintain the AC power from terminals 13 to power supply 15. However, upon relay K2 opening, as may be caused by the removal of the signal on line 17 (call terminated), or as actuated by the end-of-file signal on line 91, the AC supply to power supply 15 is broken by relay K2 opening contacts 103. This action turns off all power in the station. At this time no more data signals can be transferred over cable 12 by data source 10; the station is closed down until an attendant reestablishes operation. If it is desired to have the illustrated station maintain power on at all times, switch 104 may remain closed, thereby shorting out contacts 98. In this case, even though relay K3 is actuated holding contacts 98 open, a circuit is maintained through relay K1 to keep power supply 15 actuated even though the end-of-file signal has appeared on line 91.

In the event of a temporary loss of a solid communication circuit as may be indicated by loss of the SB signal, data transmissions are stopped, however, the station can receive data transmissions if the 40-second period has not expired. When line 26 signal is not being supplied, the data-proceed signal on line 28 is immediately removed, thereby closing AND gate 80. No more documents can then be transported. Maximum data loss would be in the one card that was being processed when communication outage occurred. 40-second timer 51 is operating. If the circuit is reestablished at least 116-milliseconds before the expiration of the 40-second period and a data card feed is initiated; then timing pulses 52A set timer 51 enabling continued operation.

As an example of a plurality of data transmissions from an unattended station, it may be desired to have several sets of tabulating cards in a single hopper. A predetermined code may be recorded on one or more of the cards indicating an end-of-file, the data source 10 supplying a signal over line 90 in response to the predetermined code rather than to an empty hopper. Then, by properly sequencing the incoming calls, the various portions of the deck of tabulating cards may be transferred to a plurality of remote stations. For example, if the illustrated station is to first transmit data to station A the first five cards may contain data for station A. Then, an end-of-file card may be inserted on top of the fifth card indicating no more data is to be transmitted to station A. Station B may be notified by station A that station A has received its desired data and that station B then may make an incoming call to communication terminal 11 for initiating the reading of a second portion of the deck of cards, for example, ten tab cards. In the alternative, station A may initiate an incoming call to communication terminal 11 at 10:00 p.m., station B at 11:00 p.m., etc. until a complete deck of cards has been transferred to a plurality of receiving stations. The decoding of a predetermined code to initiate a hopper-empty signal on line 90 is of known design and need not be discussed in detail.

I claim:

1. A data station answering system, adapted to be connected to a communication network, wherein:

the data station answering system includes a communication terminal means adapted to make a connection to the communication network for the transmission of data signals and for supplying a plurality of control signals; and data source means having a power supply and a data signal transfer means;

the improvement including in combination;

means electrically interposed between said terminal means and said data source means including security timing means responsive to a first one of said control signals supplied by said terminal means for enabling data transmission and in the absence of such first signal disabling said data transmission;

a second timing means responsive to a second one of said control signals to initiate a time-out cycle and emitting a disconnect signal at the end of the time-out cycle, and said second timing means responsive to said data source means supplying data signals to reset for reinitiating a new time-out cycle and said communication terminal means being responsive to said second timing means disconnect signal to disconnect said data source means.

2. A data station answering system for a data source adapted to be connected to a communication terminal supplying at least two communication network indicating signals, the data source requiring a plurality of control signals and capable of supplying sets of data signals for transmission to said communication terminal, the improvement including in combination, security timing means jointly responsive to said two communication network indicating signals to initiate a first timing delay and upon expiration of a predetermined time delay to supply a data-proceed signal, disconnect timing means responsive to one of said communication indicating signals to initiate a second longer timing delay and being resettable to reinitiate said longer timing delay before expiration thereof, means responsive to said one communication indicating signal to condition the data source for transmission of data, means responsive to said data-proceed signal to supply a signal to said data source upon expiration of said first mentioned delay to initiate supplying signals to said communication terminal, means responsive to said longer delay to stop the sending of said data signals and condition said communication terminal to receive no more data signals, and said data source supplying reset signals to said disconnect timing means whenever data signals are being sent to said communication terminal, said disconnect means being responsive to said reset signals to reinitiate its timing delay.

3. The station of claim 2 further including a third timing means responsive to said one communication indicating signal to supply a start signal upon the termination of a third timing delay, and means jointly responsive to said start signal from said third timing means and from said security timing means to supply an enabling signal to said data source and in the absence of said two signals to supply an inhibitory signal to said data source.

4. The system of claim 3 wherein one of said communication indicating signals is a tone lasting for about ten seconds and at least one of said means inhibiting said data source being responsive to said tone to initiate the sending of data signals only upon receipt of 10 seconds of said tone and upon cessation of said tone to inhibit transfer of data signals from said data source.

5. The subject matter of claim 4 wherein said data source is a document reader adapted to read a plurality of documents and responsive to said one communication indicating signals to start a motor for the transport of documents thereto and responsive to said signal causing initiation of feeding of data signals to initiate the reading of documents and responsive to said longer timing delay and to said inhibitory signal to stop its motor and further responsive to said one communication indicating signal being reestablished to restart its motor.

6. A data station answering system for a data source capable of supplying successive sets of data signals and having a record movement actuating motor, a power supply, a set of power input terminals, said data source capable of supplying data signals to a communication terminal having an automatic disconnect and supplying indicating signals indicative of communication circuit status, said data source further supplying a pulse indicating data signals are being transferred and supplying a signal indicative that a set of data signals has been transferred and another signal that no more data signals are available, the improvement including in combination, security circuit means jointly responsive to two of said indicating signals to supply a data-proceed signal, first relay means responsive to a third one of said indicating signals to establish an electrical connection between said power input terminals and said motor for starting said motor, disconnect circuit means having a resettable timer responsive to said third indicating signal to initiate and continue timing a time-out period and operative upon expiration of said time-out period to supply a disconnect signal to said communication terminal for causing said communication terminal to stop supplying at least one of said indicating signals, start-up circuit means having timing means and jointly responsive to said third indicating signal and said data-proceed signal to initiate a timing sequence including a final time-out period, upon expiration of said final time-out period supplying an initiate data-transfer signal to said data source, said data source then suppling at least one set of data signals to said communication terminal and said timing means responsive to said data source supplied signal indicating an end of a set of data to reinitiate said final time-out period and then send a new initiate data-transfer signal to said data source, and supplying a read-operation initiated signal, a power-off circuit having second relay means, switch means actuating said second relay means to an active condition for completing an electrical connection between said power-input terminals and said power supply, said first relay means having circuit means in parallel circuit relation to said second relay means electrical connection for maintaining said power supply in an operative condition even though said second relay means may be placed in an inactive condition, and third relay means having normally-closed switch means in series circuit with said first relay means and responsive to said read operation initiated signal to switch to an active condition for opening said normally-closed switch means thereby deactivating said second relay means, and at least said first relay means receiving power for electrical operation from said power supply.

7. The system of claim 6 wherein said power-off circuit further includes means operatively connected to said second relay means and for selectively preventing said third relay means normally-closed switch means from deactivating said second relay means.

8. The system of claim 6 wherein said start-up circuit means timing means has initial timing means responsive to said third indicating signal to initiate a third timing delay in accordance with the time required for said motor to reach full speed, AND gate means conditioned by said initial timing means on the expiration of said third timing delay for passing said data-proceed signal to supply said read-operation initiated signal, a remaining portion of said start-up circuit timing means being responsive to said read-operation initiated signal to initiate the remainder of the timing sequence, said timing means in said start-up circuit means further including AND gate means jointly responsive to a signal from said data source that no data has yet been transmitted and to said read-operation initiated signal and to said timing means not having sequenced said final timing period to initiate an intermediate timing sequence to initiate said final timing period.

9. The system of claim 6 further including an EOF generation circuit jointly responsive to said data-proceed signal, said signal indicating that a set of data signals has been transferred and said another signal that no more data signals are available to generate an end-of-file signal and supply said end-of-file signal to said communication terminal for causing said communication terminal to stop supplying one of its indicating signals.

10. The system of claim 6 wherein said security circuit means includes an adjustable time-out timer and an AND gate in said circuit receiving said two indicating signals and supplying a continuous signal to said adjustable timer only when receiving said two indicating signals, and said adjustable timer supplying said data-proceed signal upon expiration of an adjusted time-out timing period.

11. A data station answering system for a station having a data-transfer means and a communication terminal; a power supply for supplying power to the system and to said data-transfer means; the data-transfer means having a record movement motor and a set of power input terminals; said communication terminal having an automatic disconnect and supplying signals indicating communication circuit status; said data-transfer means supplying signals respectively indicating that a set of data signals has been transferred, no more data signals are to be transferred, a record document is not in a processing station; and responsive to an initiate data-transfer signal to initiate a data-transfer operation; cable means connected to communication terminal and said data-transfer means for the transfer of data signals therebetween, the improvement including in combination, security circuit means jointly responsive to two of said indicating signals to supply a data-proceed signal, disconnect circuit means responsive to a third one of said indicating signals to initiate a time-out timing period and upon the expiration of said time-out timing period sending a disconnect signal to said communication terminal, said disconnect circuit means having reset input means and responsive to a signal thereat to reinitiate the time-out period, power-out circuit means including K-1 relay means for making an electrical connection between said power supply and said power input terminals, K-3 relay data transmission indicating means jointly responsive to said third indicating signal and to said data-proceed signal for conditioning said power-out circuit relay means to turn the power supply off in response to any one of said indicating signals no longer being supplied by said communication terminal, K-2 relay means responsive to said third indicating signal to start said motor and upon no longer receiving said third indicating signal being operative to stop the motor, start-up circuit timing means responsive to said read-operation initiated signal to initiate a final timing period and supplying an initiate data-transfer signal to said data-transfer means upon expiration of said final timing period, and responsive to said signal indicating that a set of signals has been transferred to reinitiate said final time-out timing period for supplying successive initiate data-transfer signals to said data-transfer means, and end-of-file generation circuit means responsive to a signal from said data-transfer means indicating that no more data signals are to be transferred for supplying, after a predetermined time delay, a disconnect signal to said communication terminal such that it will stop supplying one of said two indicating signals whereby said data-proceed signal is removed and said power-off circuit is responsive to said signals being no longer supplied to turn off the power supply for preventing the transfer of any more data signals.

12. The system of claim 11 including bypass switch means in said power-off circuit preventing said power supply from being turned off.